United States Patent
Major et al.

(10) Patent No.: US 7,170,892 B2
(45) Date of Patent: Jan. 30, 2007

(54) NETWORK ELEMENT, AND ASSOCIATED METHOD, FOR FACILITATING COMMUNICATION OF DATA BETWEEN ELEMENTAL DEVICES

(75) Inventors: Tamas Major, Düsseldorf (DE); Mika Aalto, Espoo (FI)

(73) Assignee: Nokia Corporation, Espoo (FI)

( * ) Notice: Subject to any disclaimer, the term of this patent is extended or adjusted under 35 U.S.C. 154(b) by 395 days.

(21) Appl. No.: 10/035,360

(22) Filed: Dec. 28, 2001

(65) Prior Publication Data

US 2004/0001513 A1    Jan. 1, 2004

(51) Int. Cl.
*H04L 12/56* (2006.01)
(52) U.S. Cl. ........................ 370/392; 370/474
(58) Field of Classification Search ................ 370/392, 370/393, 474
See application file for complete search history.

(56) References Cited

U.S. PATENT DOCUMENTS

| | | | |
|---|---|---|---|
| 5,337,310 A | 8/1994 | Selyutin | 370/85 |
| 5,408,469 A | 4/1995 | Opher et al. | 370/60 |
| 5,732,080 A | 3/1998 | Fergerson et al. | 370/392 |
| 5,852,606 A | 12/1998 | Prince et al. | 370/393 |
| 6,195,351 B1 | 2/2001 | Hiscock et al. | 370/389 |
| 6,850,495 B1 * | 2/2005 | Baum et al. | 370/256 |
| 7,088,714 B2 * | 8/2006 | Athreya et al. | 370/389 |

FOREIGN PATENT DOCUMENTS

| | | |
|---|---|---|
| WO | WO00/36872 | 6/2000 |
| WO | WO00/72533 | 11/2000 |
| WO | WO00/76147 | 12/2000 |

\* cited by examiner

*Primary Examiner*—Melvin Marcelo
(74) *Attorney, Agent, or Firm*—Lackenbach Siegel, LLP; Robert M. Bauer

(57) ABSTRACT

Apparatus, and an associated method, facilitates communication of data frames between elemental devices of a network element, such as an IP (Internet Protocol) base transceiver station of a radio communication system which includes a multi-port interface converter and a router device connected by way of an Ethernet connection. Data applied to a port of the interface converter is formatted into a data frame which selectably includes a Q Tag Prefix populated with a VID (Virtual LAN Identifier) defined in the IEEE 802.1 Q standard. If the data to be communicated by the multi-port interface converter is originated at the converter, the data is formatted into a data frame, but the prefix structure is not included, and therefore the frame is not populated with the VID. When the data frame is received at the router device, detection is made as to whether the data frame includes a prefix structure. Routing of the data of the data frame is made responsive to whether the prefix structure is formed of a VID contained in the data frame.

15 Claims, 5 Drawing Sheets

NETWORK ELEMENT, AND ASSOCIATED METHOD, FOR FACILITATING COMMUNICATION OF DATA BETWEEN ELEMENTAL DEVICES

The present invention relates generally to a manner by which to facilitate communication of data between of a multiple-device network element, having elemental devices such as an interface converter and a router of an Radio Access Network base station. More particularly, the present invention relates to a network element, and an associated method for communication between the elemental devices to transmit externally originated payload data combined with controlling data, inter elemental device communication and network management information. Because a standard, rather than proprietary protocol is utilized, the multi-device network element can be of reduced cost and complexity relative to a corresponding network element utilizing a proprietary protocol and interface.

BACKGROUND OF THE INVENTION

A cellular communication system is a radio communication system which has been installed throughout large geographical areas and which communicates with different types of networks of different subscribers. For exchange of payload and signaling data between cellular communication system and other networks are several interfaces in use.

Advancements in communication technologies have permitted the development and construction of successive generations of cellular communication systems with, generally, an increasing array of communication services available to subscribers to the systems.

A cellular communication system includes an Radio Access Network having base transceiver stations. An base station includes, for instance, several modules containing different transmission interface devices for communication with other networks and at least a router. Conventionally, several backplane connections interconnect the elemental devices of the base station to transmit payload-controlling and management data between the devices. The transmission interface device comprises an interface converter having external ports to which data is applied. Data generated external to the elemental devices and applied thereto as well as data generated internal to the elemental devices might need to be communicated between the elemental devices. Both the externally-generated data like payload from and to a user terminal and the internally-generated data, such as data used for management purposes, have to be exchanged between the devices of the network element. When a common interface is used for all kinds of data, each of the elemental devices must be able to determine whether the data transmitted via common interface is externally-generated data or internally-generated data. While proprietary interfaces and protocols can be provided by which to facilitate the determination, such use typically would increase the cost and complexity of the system. The use, instead, of a common standard protocol and interfaces would be preferable.

More generally, communications between any two devices interconnected by way of a common connection would analogously benefit if a standard protocol could be used to distinguish between internally-generated and externally-generated data forming a frame communicated between the separate devices.

A manner, using a standard protocol, by which to identify the origin of the data contained in the frame is, therefore, needed.

Network elements also sometimes utilize redundant elemental devices when operations performed at such units are essential for element operation. Intelligent routers in network elements, for instance, are essential to operation of the network element, such as a base station, and are installed in the network element. In the event of failure of a primary router, an alternate router is used to perform the operations normally performed by the primary router. Thereby, operation of the network continues. The term "protection" is sometimes utilized to indicate that a telecommunication service is ensured to continue even if a portion of the network at which the service is to be effectuated is not working properly. Use of redundant components, such as a redundant router, provides such protection.

Equipment protection treats defects that are localized in a node. The use of redundant, spare circuitry, compensates for, or replaces, failed components and protect equipment.

Network elements operable in a telecommunication network are constructed to meet operational standards, defined in terms of availability and mean time between failures. The requirements are generally fairly strict. For instance, network operators of public networks regularly require system availability around 99.99 percent of the time. The use of redundant devices is used to fulfill such requirements. One elemental device, referred to as an active device, is normally working, and another device, referred to as a redundant device, merely controls, or monitors, the active device while the active device is operable. If the redundant device unit determines that the active device is not working well enough, the redundant device becomes the active device and takes over the functionality of the active unit. Protection switching is involved in the changeover of operations from the active device to the redundant device. Protection switching occurs, normally, very quickly and does not have any impact on the overall functionality of the functional operations performed by the active and redundant devices. Conventionally, physically-separated signaling cables are used with the active and redundant devices. However, the use of such separate cables, in addition to an payload link, or other network path, increases hardware costs as a result of use of a non-standardized connecting device, and associated implementing apparatus.

A manner, using a common linking means for any kind of communication between the devices of a network element would be advantageous.

It is in light of this background information related to the communication of data that the significant improvements of the present invention have evolved.

SUMMARY OF THE INVENTION

The present invention, accordingly, advantageously provides a multiple-device network element, and an associated method, by which to facilitate communication of data between elemental devices.

Through operation of an embodiment of the present invention, a manner is provided by which to form a known standard compliant Ethernet point-to-point link for communication between two, or more, elemental devices of the multiple-device network element. A standard Ethernet protocol, e.g. as defined in the IEEE 802.3 standard, is utilized which permits the multi-device network element to be of reduced complexity and cost in contrast to a corresponding network element which utilizes common backplane links.

In one aspect of the present invention, data to be communicated by a first elemental device to a second elemental device by way of an Ethernet connection is encapsulated in different Ethernet frames. According to an embodiment of the present invention, for complete device communication the elemental devices are only connected via standard compliant Ethernet point-to-point links, using a unique Ethernet MAC address for each device.

The Ethernet connection transmits both as Ethernet frames for exchanging common payload data as special Ethernet frames for exchanging management information to avoid separate management network connections. The network element is a single Sub-net. To distinguish between data originated from or destined during communication, the network element performs one complete Virtual Local Area Network VLAN with Ethernet links. Each elemental device contains VLAN processor means with an Ethernet frame encapsulator for inserting a tag control information field, a so-called Q Tag Prefix, in the header of such Ethernet frames originated from or destined to different physical interfaces. The Q Tag Prefix includes a VID (Virtual lan IDentifier) that identifies the origin of the data encapsulated into the frame defined pursuant to the IEEE 802.1Q standard.

In another aspect of the present invention, the data encapsulated into the frame is originated at one of the elemental devices. When the data is originated at one of the elemental devices, it is not necessary to insert the Q Tag Prefix, or analogous structure, with the VID into the Ethernet frame. A conventional not-tagged Ethernet frame can be used for transmission of that data. When received at an elemental device, a detector searches for the Q Tag Prefix, or analogous structure. When analysis detects the absence of the Q Tag Prefix, the second elemental device determines the data contained in the frame to have been originated at the first elemental device. When frames are communicated pursuant to an inter unit communication, the Q Tag Prefix with the V ID is not necessarily available for examination. Such frames are used directly for management purposes.

Conversely, when the data encapsulated into the frame is generated external to the first elemental device and, for instance, applied thereto by way of an external port of an elemental device, the Q Tag Prefix, or other tag header field, is populated with a value of a VID. The value is selected to correspond with the external port at which the data is applied to the first elemental device. The data frame is communicated upon the Ethernet connection to the second elemental device. When received at the second elemental device, analysis is made of the Q Tag Prefix to determine whether the field is populated with the value of the VID. When detected, the value indicates the data to define the destination interface.

The VID identifies the external port at which the data is applied to the elemental device.

When the data frame is received at the destination device, analysis of the frame structure regarding a Q Tag Prefix is made. If the frame contains a Q Tag Prefix populated with a VID, the data contained in the frame is passed on to the corresponding destination point.

In one implementation, communication is effectuated between a multi-port interface converter and a router of a base station. External data is selectably applied to external ports of the multi-port interface converter. And, internally-generated data, such as management information, is generated at the interface converter. A VLAN processor of the interface converter encapsulates data into a data frame and selectably populates a Q Tag Prefix, e.g., defined by the IEEE 802.1Q standard, with a VID, defined by the IEEE 802.1Q standard. A VID is associated with each of the external ports to which external data is selectably applied to the converter. When the data encapsulated into a data frame is externally-generated data, the Q Tag Prefix is populated with the VID associated with the external port at which the data is applied. If, conversely, the data is internally-generated, the Q Tag Prefix is not populated with a VID or in a specific advantageous embodiment of invention conventionally Ethernet frames, e.g. according IEEE 802.3, are used Once encapsulated into a data frame, the data frame is communicated upon an Ethernet connection to the router, and the Q Tag Prefix is analyzed to determine the origination and destination of the data of the data frame. Data originated at, or applied to, the router is analogously encapsulated and communicated to the converter.

Because a standard protocol, the IEEE 802.1Q protocol, is utilized, a proprietary protocol and corresponding interface need not be developed and used. A base station, or other network element formed of elemental devices, can be constructed less expensively and with less complexity than would otherwise be required of a corresponding element.

In another aspect of the present invention, a manner is provided by which to signal the protection state of redundant units to indicate the status of individual ones of the redundant units. The signaling is generated to indicate whether a unit is on active status or is in a stand-by status. The signaling information flows are generated by way of the same internal Ethernet link, local area network (LAN), or other network pathway, between the redundant units. Periodic, added message Ethernet frames are used. When the redundant units are formed of an active router unit and a stand-by router unit in an IP network, separate multi-interface units have an Ethernet connection.

In these and other aspects, therefore, apparatus, and an associated method, is provided for a network element having several elemental devices. At least two elemental devices, respectively, are connected together by a connector. Communication of data, sourced at a first data source, at least from one elemental device to another elemental device is facilitated. A frame encapsulator receives from a first data source the data to be communicated to the other elemental device. The frame encapsulator frame-formats the data into a data frame. The data frame has a header portion and a data portion. To identify different data sources the header portion includes a prefix structure, such as a Q Tag Prefix, populated with a tag header. The tag header field formed of a Q Tag Prefix is not a specific, reserved field, but rather is a prefix inserted at a well defined location of the header portion. The data frame, once formed, is for communication upon the connector to the second elemental device.

A more complete appreciation of the present invention and the scope thereof can be obtained from the accompanying drawings which are briefly summarized below, the detailed description of the presently preferred embodiments of the invention, and the appended claims.

DETAILED DESCRIPTION

Figure 1:
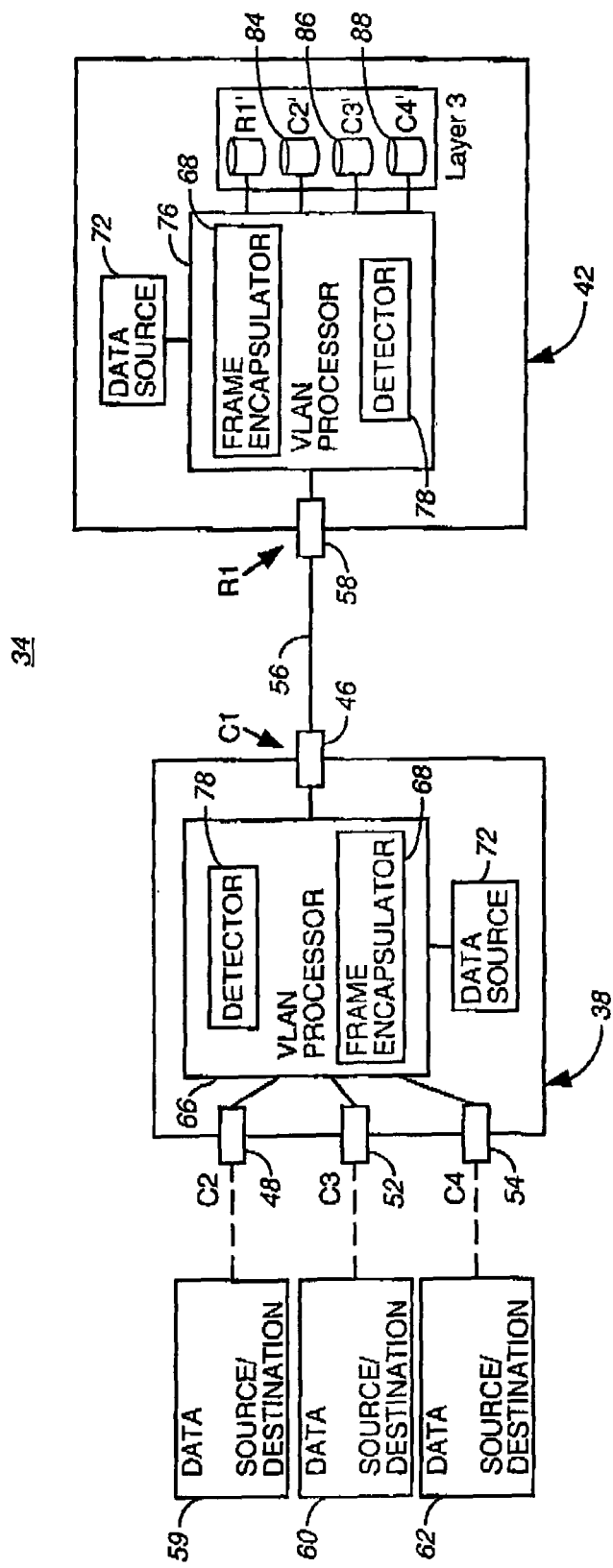
FIG. 1 illustrates a functional block diagram of exemplary elemental devices of a network element which includes an embodiment of the present invention.

Referring first to FIG. 1, a portion 34 of a network element is shown. The network elements of which the portion 34 is embodied comprise, e.g., parts of a transport element device 38 and a router device 42 of a network element.

The network elements at which the portion 34 is embodied are exemplary only. The structure, and corresponding method, of an embodiment of the present invention can be implemented in any of many types of devices. Accordingly, while the portion of the network element shown in the figure shall be described with respect to a transport element device 38 and a router device 42, implementation of an embodiment of the present invention with other structure can analogously be described. And, the devices 38 and 42 can also together be embodied as a stand alone element rather than embodied within another network element. Also, while the following description shall describe data flow, generally, from left-to-right in the figure, the implemented devices are two-way devices, capable of reverse-direction flow in the same manner as the left-to-right, i.e., forward flow, is effectuated.

Here, the transport element device 38 forms a multi-port interface converter having a plurality of data ports for communication with net entities in other networks, here data ports 46, 48, 52, and 54. The port 46 forms a connecting port for forming an Ethernet connection 56 with a corresponding port 58 of the router device 42. The frame format used on the Ethernet connection is Ethernet, specified by the IEEE 802.3 standard specification The ports 48, 52, and 54 form external data ports permitting exchange of data with entities external from the network element. For purposes of illustration, a net entity 59 formed of a data source/destination is shown to be coupled to the port 48, a net entity 60 formed of a data source/destination is coupled to the port 52, and a net entity 62 formed of a data source/destination is coupled to the port 54.

According the invention the transport element device 38 here further includes a VLAN (Virtual Local Area Network) processor 66. The VLAN processor, along with other elements shown in the figure are functionally represented and can be implemented in any desired manner. For instance, the VLAN processor can be implemented alternately as a hardware device, a software device, or a combination of both devices. The processor is coupled to each of the ports 46, 48, 52, and 54. The processor includes a frame encapsulator 68 operable to frame-format data provided to the transport element device upon any of the ports 48, 52, or 54.

The VLAN processor 66 is further coupled to receive internally-generated data here represented to be sourced at a data station 72. The internally-generated data is also frame-formatted to be encapsulated in frames different from the remaining data traffic thereby.

Each of the ports 48, 52 and 54 are identified with a VID (Virtual lan IDentifier). When data is applied to any of the ports, the data is encapsulated into a frame format by the frame encapsulator (68) of the VLAN processor 66. The identity of the port at which the data is applied, in terms of the VID, is also provided to the VLAN processor. To identify the different frames of the ports 48, 52 and 54 in the data stream between the elemental devices frame encapsulator 68 tags the corresponding frames and inserts the VID allocated to the origin source in the Q-tag prefix.

All kinds of data frames encapsulated by frame encapsulator 68 are provided to the port 46 and communicated upon the Ethernet connection to the router device 42. The router device also includes a VLAN processor, here designated at 76, to which the data frames are applied. The processor includes a functional entity forming a detector 78. The detector searches for tagged frames and reads the VID contained within the header portion of the frame to determine to which logical layer 3 interface the frame should be routed. Here, the data destination can be for the router device itself, here indicated by the component 82, to another location within the network element of which the portion 34 forms a portion, or the frame is to be forwarded to another location, here indicated by the components 84, 86, and 88. A forwarding decision to forward the data frame is made, for instance, responsive to the VID contained in a tagged frame, and the frame is thereafter sent by way of another interface (not shown). And, once delivered to the appropriate layer 3 interface element, routing of forwarding decisions are made responsive to information, here VID, within the received data.

As two-way communication is permitted between the devices 38 and 42, the VLAN processor 78 also includes a frame encapsulator 68 and the VLAN processor 66 also includes a detector 78. A data source 72 representative of internally-generated data is also shown at the device 42. Viz., each device includes both tagged frame recognition means and VID extracting means.

Figure 2:
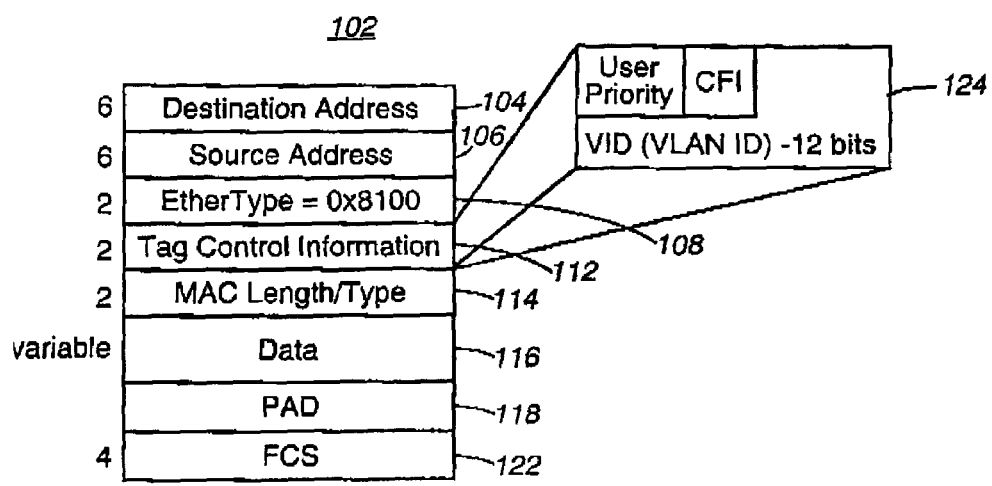
FIG. 2 illustrates a representation of the tagged frame structure of a frame formed pursuant to IEEE 802.1Q.

FIG. 2 illustrates the frame structure of a data frame into which data is frame-formatted by the frame encapsulator 68 (shown in FIG. 1). The data frame, shown generally at 102, is exemplary of a tagged data frame according IEEE 802.1Q formed of externally-generated data applied to the transport element device to use in a VLAN . The data frame is formatted to include a header portion having after a preamble, not shown, a destination MAC address field 104, a source MAC address field 106, an Ether-type field 108, a tag control information field 112, and a MAC (Media Access Control) length/type field 114. A payload portion includes a data field 116, a PAD field 118 and an Frame Check Sequence FCS field 122. The data format corresponds to a format set forth in the IEEE 802.1Q standard protocol.

The tag control information field 112 includes a Q Tag Prefix 124 at which a VLAN identifier is selectably inserted pursuant to an embodiment of the present invention. Here, when the data encapsulated by the frame encapsulator is originated external to the transport element device at one of the ports 48–54 thereof, the frame encapsulator populates the tag header field 124 with the VID associated with the port at which the data is received.

According a specific embodiment of invention, when the data encapsulated into the frame are exchanged between data station 72 and component 82, i.e., internal management information to and/or from the transport element device, the frame should advantageously not include the Q Tag Prefix or not be populated with a VID value. Subsequent to communication of the data frames to the router device, the detector 78 thereof searches in each received data frame for a Q Tag Prefix to determine the origin of the data frame. If the received data are not tagged or a Q Tag Prefix is not populated with a VID, the data contained in the frame is known, thereby, to have been originated at the device 38 for use by the router device 42.

In other words, data received by the transport element device 38 at the ports 48, 52, or 54 thereof, are encapsulated into a tagged Ethernet frame by the frame encapsulator of the VLAN processor. The destination address field is populated with the MAC (Medium Access Control) address of the router device 42 and a VLAN Q Tag Prefix is inserted into an added tag control information field 112 according to the EEE 802.1Q protocol utilizing the VID associated with the appropriate port 48, 52, or 54. The Ethernet frame is then communicated upon the Ethernet connection from the port 46.

Conversely, data which is generated at the data source 72, is formatted by the frame encapsulator into a data frame and communicated upon the Ethernet connection from the port 46 without a VLAN Q Tag Prefix in a "not tagged" frame. When the Q Tag Prefix of the data frame is not populated with the VID, any other device, which is unaware of any special functionality of the device 38, considers the device to behave as an ordinary device.

When a data frame is detected at the router device, whether a tagged or a not tagged frame, analysis is made to determine whether the Q Tag Prefix includes a VID. If the data frame is a not tagged frame, the data contained therein is directly passed to a next-higher layer, here indicated by the element 82, as the data frame is indicated to have been received at the port 58. If the data frame is a tagged data frame, noted to have been received at the port 58, then the value of the VID is analyzed. Depending upon the value of the VID, the associated port 48–54 at which the data contained in the data frame is originated is determined, and the data contained in the frame is passed on to a next-higher layer indicating on which port of the device 38 at which the data was received.

Communication of data is analogously effectuated at the routing device 42. Data is available in a higher-level layer, here designated as logical layer 3 data. Frame formatting is performed on the data by operation of the VLAN processor and all data frames are communicated from a data port of the device, such as the data port 58, to a specific destination device, here the transport element device 38 or a device coupled thereto on the ports 48, 52, or 54.

If the destination of data frames originated at the router device 42 is the transport element 38, the data frames are communicated by way of the Ethernet connection 56 subsequent to frame formatting operations at the VLAN processor 76. While not separately shown, the VLAN processor 76 includes a frame encapsulator function analogous to the frame encapsulator 68 shown to form a portion of the VLAN processor of the transport element device 38. When the destination of the data frame is the transport element device, the Q Tag Prefix of the data frame is not populated with a VID, or the frame encapsulator function generates a not tagged frame. In another implementation, the data frame can be populated with a VID which identifies the transport element device. In the exemplary implementation, the data frame, to be destined to the transport element device forms a not tagged data frame. When the data frame is received at the transport element device, detection by a detector, analogous to the detector 78 of the VLAN processor 76, is utilized at the VLAN processor 66 to determine whether a tag header field was inserted and is populated with a VID. If determination is made that the data frame forms a not tagged data frame, the data is passed on to a higher logic level layer of the device 38 for further processing.

If, conversely, the destination of the data frame is to a device coupled to the ports 48, 52 or 54, then the tag header field is populated with a VID associated with the intended destination. All tagged and not tagged data frame are communicated upon the Ethernet connection to the transport element device 38. Once received thereat, detection is made as to whether the data frame includes a tag header field with a VID. When the VID is detected and its value determined, the data frame is routed to the appropriate port 48, 52, or 54 and sent out from the appropriate port.

The VID is of characteristics specified pursuant to the IEEE 802.1Q standard. The VID is, therefore, of a 12-bit length and is positioned within the tag control information portion of the data frame set forth in the IEEE 802.1Q standard.

Figure 3:
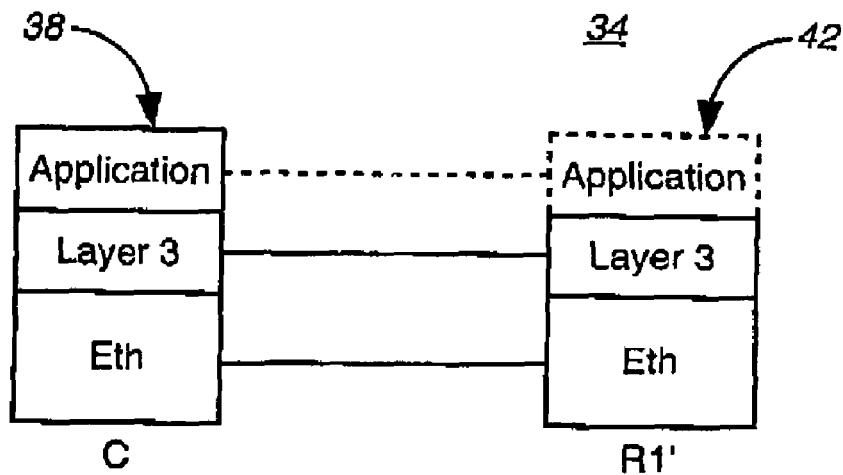
FIG. 3 illustrates a functional representation, in logical-layer form, of communication of a first data frame-type between the elemental devices shown in FIG. 2.

FIG. 3 illustrates the portion 34 shown in FIG. 2, here representing, in logical layer form, the devices 38 and 42. Here, the protocol stacks represent internal communication between the transport element device and the router. Here, communication of a not tagged data frames is represented.

Figure 4:
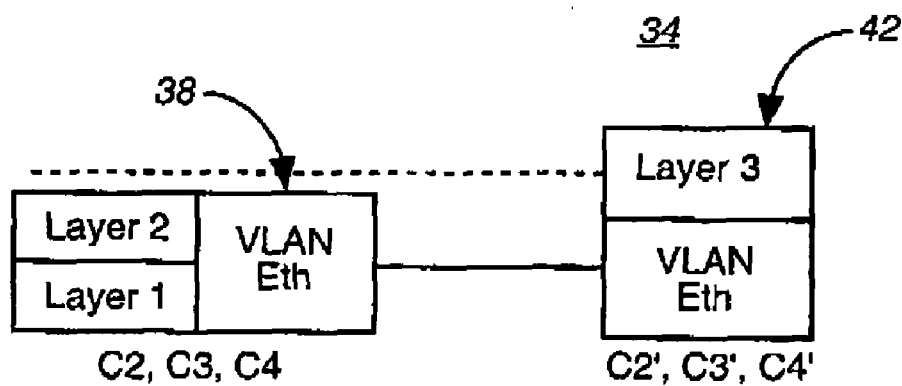
FIG. 4 illustrates a functional representation in logical layer form, similar to that shown in FIG. 2, but here communication of a second data frame-type communicated between the elemental devices shown in FIG. 1.

FIG. 4 again illustrates the portion 34 of a network element, here representing, again in logical layer form, the devices 38 and 42. Here, the protocol stacks represent external communication of tagged data frames from the transport element device 38 to the router device 42. The data contained in the data frames is originated beyond the external interfaces 48, 52, or 54, and the Q Tag Prefix is populated with a coresponding VID. Higher-level logical layer data is communicated to the router device 42. As the Q Tag Prefix is populated with a VID, and the data frame is passed on to the higher-level logical layers of the router device for further processing thereat.

Figure 5:
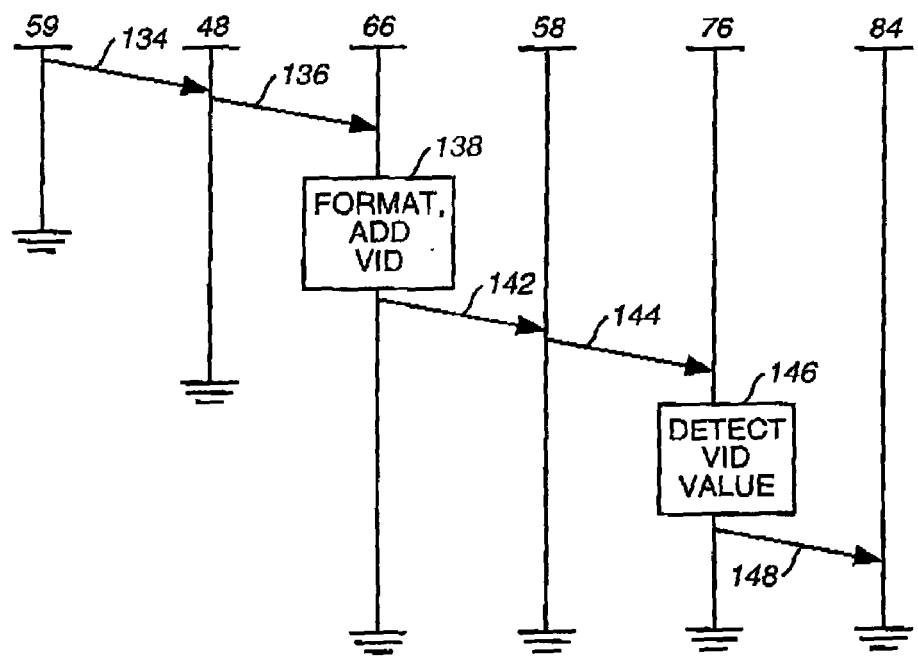
FIG. 5 illustrates a message sequence diagram representative of communication of data between the elemental devices shown in FIG. 1.

FIG. 5 illustrates a message sequence diagram, shown generally at 132, representative of routing of data sourced at the data source 59 through the portion 34 (shown in FIGS. 2–4) of the network element. The data is applied, as indicated by the segment 134, to the port 48. From the port 48, the data is forwarded, as indicated by the segment 136, to the VLAN processor 66. As indicated by the block 138, the data is formatted into a frame and the Q Tag Prefix of the frame is populated with a VID associated with the port 48.

Thereafter, the formatted data frame is communicated, indicated by the segment 142, to the port 58 of the router device 42. The data frame is forwarded to the VLAN processor 76 whereat, and as indicated by the segment 146, detection is made of the value of the VID populating the Q Tag Prefix of the data frame. The data is then forwarded, as indicated by the segment 148, to the layer 3 element 84. An analogous message sequence diagram also represents data sourced at a component 84, 86, or 88 and sent by the device 42 upon the link 56 to the device 38.

Signaling can also be effectuated between redundant elemental devices, formed of an active device and at least one stand-by device. Signaling of the protection state of the redundant devices to indicate their respective status, i.e., active or stand-by, is provided. The signaling information flows by way of the internal Ethernet LAN formed to extend between the redundant devices using periodic, added message Ethernet frames. The redundant devices form, for instance, active and stand-by router units.

In order to quickly activate a stand-by device, a protection controller in the stand-by device controls the active router. Both devices utilize the same MAC- and the same IP-addresses by way of identical ports of the respective, connected devices. Both connections are terminated in each multi-interface unit at the same port. If the stand-by unit determines that the active unit is not operating adequately, the stand-by unit becomes active and takes over the functions of the active device. That is, the stand-by unit becomes the active unit. A defect of the first active unit could affect both of the units, i.e., both the active and stand-by units, being simultaneously active and the first unit sends incorrect traffic data. Appropriate indication of the correct working unit in each multi-interface unit is needed to execute a protected switchover on its port.

Within selected time intervals, all active units send status messages by way of the standardized Ethernet connection to indicate their states. The messages are sent in an additional, specific Ethernet frame, different from other data frames. Each message contains a device-related ranking number. A communication between an active unit and a stand-by unit performed before the occurrence of a unit defect or mis-operation adjusts the ranking number of the stand-by unit in such a way that the stand-by unit starts sending a ranking number higher than that of the active unit when the stand-by unit becomes active. If a protected switchover between the redundant units occurs, the multi-interface units identify the value traffic from both active units by the ranking numbers.

Figure 6:
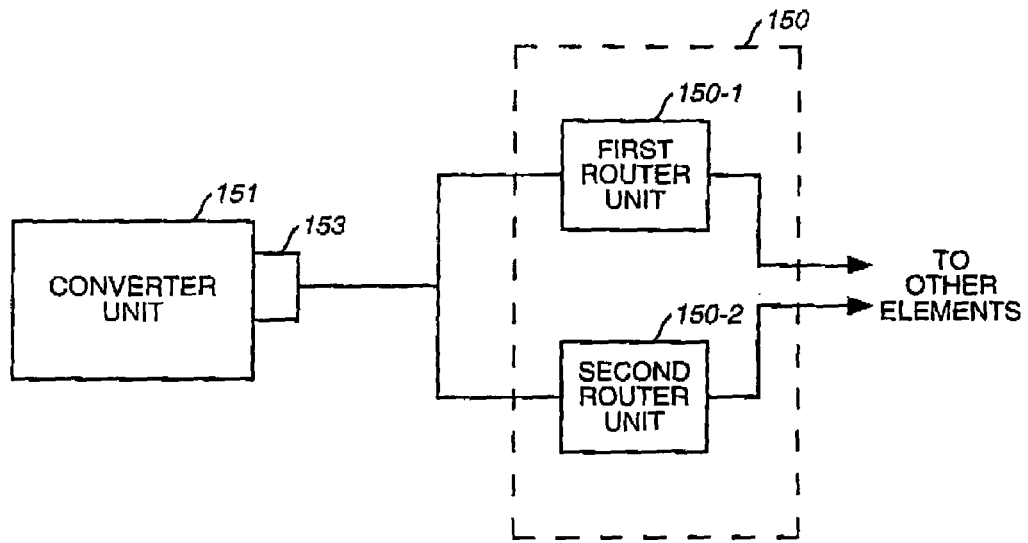
FIG. 6 illustrates a set of routers in an embodiment of the present invention.

FIG. 6 illustrates a set of routers 150 formed of a first router unit 150-1 and a second router unit 150-2. During operation, one of the router units forms an active unit and the other of the router units forms a stand-by unit. A converter unit 151 is coupled to the router units by way of Ethernet links 152-1 and 152-2, respectively. The Ethernet links are commonly coupled at a port 153 of the converter.

During operation, the converter must determine which of the Ethernet links 152-1 or 152-2 extends to the active router unit. The determination is made responsive to data received from both of the router units.

For purposes of example, the active router unit shall be the unit 150-1 and the router unit 150-2 forms the stand-by unit.

During regular time intervals, the active router unit 150-1 sends special messages indicating its status as the active router unit. The messages are sent in an Ethernet frame of a different type than that is used to send normal data. The separate data types, therefore, do not interfere. The messages sent by the active router in the Ethernet frame of the different type contain a number as a parameter.

The converter determines which of the router units is the active router unit in a two-step procedure. First, the converter determines whether the special messages that are received are generated by only one of the router units. If only one of the router units is sending the special messages, that router unit forms the active router unit. If, however, messages are received from both of the router units within a common time period, then the active unit is determined to be the router unit that sends a message containing a higher value, or other rated, number in its message. Both router units may send messages when a stand-by router unit becomes the active router unit while the previously-active router unit might well continue to attempt to function as the active router unit.

When the router unit 150-1 forms the initially-active router device, the router 150-2 acts in a stand-by mode and forms the stand-by router unit. The stand-by router unit operates in the stand-by mode to monitor operation of the active router unit to ensure its proper functioning. The stand-by router unit also maintains an awareness of the value of the number in the indication messages sent by the active router unit. If the stand-by router unit determines the active router unit not to be operating properly, the stand-by router unit becomes active and takes over operation of the active router functions. The previously-stand-by router unit indicates its status as the new active router unit by sending indication messages to the converter with a number of a value greater than the value of the number utilized by the previously-active router. If the previously-active router unit is still sending indications messages, the converter is still able to determine that the newly-active router unit is the active router unit due to the higher value of the number in the message.

When the previously-active router unit is replaced and becomes the new stand-by router unit, the router unit becomes operable as the stand-by router unit. If again a protection switching is required, the same procedure is again effectuated.

Figure 7:
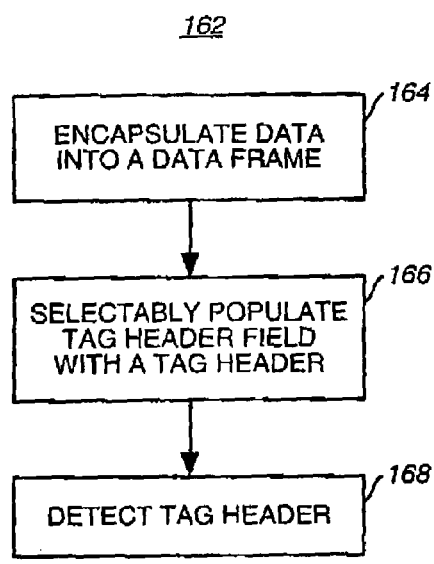
FIG. 7 illustrates a method flow diagram which lists the method of operation of an embodiment of the present invention.

FIG. 7 illustrates a method flow diagram, shown generally at 162, of the method of an embodiment of the present invention. The method facilitates communication of data, sourced at a first data source, from a first elemental device of a network element to a second elemental device of the network element.

First, and as indicated by the block 164, the data to be communicated is encapsulated into a data frame. The data frame has a header portion and a data portion. The header portion selectably includes a prefix structure, such as a Q Tag Prefix. The resultant data frame is communicated by way of an Ethernet connection to the second elemental device. Once received thereat, detection is made, indicated by the block 168, of the Q Tag Prefix, selectably included as part of the header portion.

Thereby, a manner is provided by which to facilitate communication of data between the elemental devices of the multiple-device network element.

The preferred descriptions are of preferred examples for implementing the invention, and the scope of the invention should not necessarily be limited by this description. The scope of the present invention is defined by the following claims.

The invention claimed is:

1. In a network element having a first elemental device and at least a second elemental device, the first and at least second elemental devices, respectively, connected together by a connector, an improvement of apparatus for facilitating communication of data, sourced at a first net entity, at least from the first elemental device to the second elemental device, said apparatus comprising:

a frame encapsulator coupled to the first net entity to receive data to be communicated to the second elemental device, said frame encapsulator for frame-formatting the data into data frames, the data frames having a header portion and a data portion, the header portion selectably including a prefix structure, the prefix structure identifying the first net entity, the data frame, once formed, for communication upon the connector to the second elemental device;

wherein the first elemental device comprises at least a first external port and wherein the first net entity is positioned external to the first elemental device and coupled to the first external port thereof, and wherein the prefix structure identifies the first external port to which the first data source is coupled; and wherein the first elemental device comprises a Virtual LAN (local area network) processor and wherein said frame encapsulator is embodied at the Virtual LAN processor.

2. The apparatus of claim 1 wherein the prefix structure included as part of the header portion selectably formed by said frame encapsulator comprises a VLAN (Virtual Local Area Network) Identifier (VID).

3. The apparatus of claim 2 wherein the prefix structure is of a length corresponding a VIP field defined pursuant to an IEEE 802.1Q standard, and wherein the VIP comprises an IEEE 802. 1Q-defined VIP.

4. The apparatus of claim 1 wherein the first elemental device comprises a packet-data interface converter, wherein the first net entity comprises a packet data source, and wherein the prefix structure that identifies the first external port is a configuration parameter.

5. The apparatus of claim 1 wherein the data sourced at the data source is defined in terms of logical layers, the data formed of at least one lower-level logical layer and at least one higher-level logical layer and wherein the data formatted by said frame encapsulator comprises data formed of the at least one higher-level logical layer.

6. The apparatus of claim 1 wherein the first elemental device comprises an output port, the connector coupled to output port, wherein the second elemental device comprises an input port, the connector coupled to the input port, and wherein the data frames, once formed by said frame encapsulator is provided to the output port of the first elemental device.

7. The apparatus of claim 1 wherein an additional data entity is positioned internal to the first elemental device and wherein the prefix structure of the header portion of the data frame formed by said frame encapsulator and comprising data generated by said additional data entity remains unpopulated such that the data frame forms a "not tagged" frame.

8. The apparatus of claim 7 further comprising a net entity wherein the first elemental device comprises at least a first external port, wherein the net entity is positioned external to the first elemental device and coupled to the first external port thereof, and wherein the data frame formed by said frame encapsulator is selectably formed of data sourced by the first net entity and of data sourced by the additional data entity.

9. The apparatus of claim 7 wherein the data sourced at the data entity comprises management data and the data sourced at the net entity comprises payload data and wherein the tag header field is populated with the tag header when the data frame is formed of the data sourced by the net entity.

10. The apparatus of claim 1 further comprising:
a detector positioned at the second elemental device and coupled to receive indications of the data frame communicated from the first elemental device to the second elemental device, said detector for detecting whether the prefix structure is included as part of the header portion.

11. The apparatus of claim 10 wherein, when said detector fails to detect the prefix structure to form part of the header portion, the data frame is indicated merely to be received at the first elemental device.

12. The apparatus of claim 11 wherein the first elemental device comprises at least a first external port and wherein the first data port is positioned external to the first elemental device and coupled to the first external port thereof; the prefix structure identifying the first external port, and wherein, when said detector detects the prefix structure, said detector further identifies the first data port to be associated with the data frame.

13. In a method for communicating at a network element having a first elemental device and at least a second elemental device, the first and at least second elemental devices, respectively, connected together by a connector, an improvement of a method for facilitating communication of data, at least from the first elemental device to the second elemental device, said method comprising:

encapsulating the data to be communicated into a data frame, the data frame having a header portion and a data portion; and selectably inserting a prefix structure into the header portion;

wherein the prefix structure selectably inserted into the header portion during said operation of selectably inserting comprises a VLAN (Virtual Local Area Network) Identifier (VID); and wherein the first elemental device comprises at least a first external port and wherein the first data source is positioned external to the first elemental device, coupled to the first external port thereof, said method further comprising the operation of naming the first external port with a first VID, the prefix structure populated with the first VID.

14. The method of claim 13 further comprising the operations of:

communicating the data frame by way of the connector to the second elemental device; and detecting, once the data frame is delivered to the second elemental device, whether the header portion includes the prefix structure.

15. The method of claim 13 wherein the prefix structure selectably inserted into the header portion during said operation of selectably inserting comprises a VLAN (Virtual Local Area Network) Identifier (VID).

* * * * *